United States Patent
Schenk et al.

(10) Patent No.: US 9,712,276 B2
(45) Date of Patent: Jul. 18, 2017

(54) ERROR REPORTING IN MULTI-CARRIER SIGNAL COMMUNICATION

(75) Inventors: Heinrich Schenk, Munich (DE); Axel Clausen, Munich (DE); Vladimir Oksman, Morganville, NJ (US)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 655 days.

(21) Appl. No.: 12/914,030

(22) Filed: Oct. 28, 2010

(65) Prior Publication Data

US 2011/0110402 A1    May 12, 2011

Related U.S. Application Data

(60) Provisional application No. 61/259,798, filed on Nov. 10, 2009.

(51) Int. Cl.
 *H04K 1/10* (2006.01)
 *H04L 1/00* (2006.01)
 *H04L 1/12* (2006.01)

(52) U.S. Cl.
 CPC .............. *H04L 1/0001* (2013.01); *H04L 1/12* (2013.01)

(58) Field of Classification Search
 CPC combination set(s) only.
 See application file for complete search history.

(56) References Cited

U.S. PATENT DOCUMENTS

| | | | |
|---|---|---|---|
| 5,956,673 A * | 9/1999 | Weaver, Jr. | G10L 19/16 455/436 |
| 6,700,879 B1 * | 3/2004 | Taylor | 370/332 |
| 7,362,812 B1 | 4/2008 | Hou et al. | |
| 8,098,717 B1 * | 1/2012 | Griniasty | H04L 25/0244 375/142 |
| 2004/0247038 A1 | 12/2004 | Uesugi et al. | |
| 2005/0175078 A1* | 8/2005 | Redfern | H04L 5/1438 375/222 |
| 2005/0286624 A1* | 12/2005 | Park | 375/232 |
| 2006/0033814 A1* | 2/2006 | Avadanei | H04N 17/00 348/193 |
| 2006/0067388 A1 | 3/2006 | Sedarat | |
| 2006/0067417 A1* | 3/2006 | Park | H04B 7/0626 375/260 |
| 2008/0117999 A1* | 5/2008 | Kadous | H04B 7/0417 375/267 |
| 2009/0003468 A1* | 1/2009 | Karabulut | H04L 5/0007 375/260 |
| 2009/0060013 A1* | 3/2009 | Ashikhmin | H04B 3/32 375/222 |
| 2009/0122855 A1* | 5/2009 | Duvaut | H04B 3/32 375/232 |

\* cited by examiner

*Primary Examiner* — Wednel Cadeau
(74) *Attorney, Agent, or Firm* — Eschweiler & Potashnik, LLC

(57) ABSTRACT

In a communication device, a multi-carrier signal with at least one group of signal carriers is received from a communication connection. For each of the signal carriers, at least one individual error value is evaluated or generated. From the individual error values, a combined error value is evaluated or generated. The combined error value is transmitted on a backchannel of the communication connection.

21 Claims, 12 Drawing Sheets

F.I.G. 6

ERROR REPORTING IN MULTI-CARRIER SIGNAL COMMUNICATION

CROSS-REFERENCES TO RELATED APPLICATIONS

This application is a non-provisional application of Ser. No. 61/259,798, filed Nov. 10, 2009. The content of the foregoing application is incorporated herein by reference.

FIELD

The present invention relates to techniques for error reporting in multi-carrier signal communication.

BACKGROUND

For purposes of data communication, it is known to use multi-carrier signal communication. One form or type of multi-carrier signal communication is the Digital Subscriber Line (DSL) technology. In order to improve performance of the DSL technology, it is known to use a technique which is referred to as "vectoring" or "vectored data transmission".

In vectoring or vectored data transmission, transmission or reception of data between a plurality of transmitters and a plurality of receivers via a plurality of communication connections is coordinated in order to improve the transmission, for example to reduce the influence of crosstalk. Either transmitters or receivers are co-located.

In DSL transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of received signals is sometimes referred to as crosstalk cancellation. The communication connections which are processed jointly are sometimes referred to as a vectored group.

Both at the initialization of communication and during communication, it may be necessary to add an additional communication connection to the vectored group, for example when an additional user of a DSL service becomes active. In such cases, a training has to be performed to determine the influence from the communication connection to be added to the vectored group to the communication connections already in the vectored group and vice versa to cancel the crosstalk. Training may also become necessary if crosstalk characteristics between different communication connections change for some reason.

During training of a vectored DSL system, it is known to send a multi-carrier training signal from a central office (CO) to a customer premises equipment (CPE). At the CPE, an individual error value is evaluated for each signal carrier. The individual error values are then transmitted back to the CO on a backchannel of the communication connection and used for adapting crosstalk cancellation parameters.

Since transmitting the individual error values on the backchannel requires bandwidth, there is a need for efficient error reporting techniques in multi-carrier signal communication.

SUMMARY

In an embodiment, an apparatus is provided which comprises a receiver, a transmitter, and an error processor. The receiver is configured to receive a multi-carrier signal from a communication connection. The multi-carrier signal comprises at least one group of signal carriers. The error processor is configured to evaluate (i.e., determine) at least one individual error value for each of the plurality of signal carriers. The error processor is further configured to evaluate or determine a combined error value from the individual error values. The transmitter is configured to transmit the combined error value on a backchannel of the communication connection.

In another embodiment, an apparatus is provided which comprises a receiver and a transmitter. The transmitter is configured to transmit a multi-carrier signal on a communication link. The multi-carrier signal comprises a plurality of signal carriers. The receiver is configured to receive, from a backchannel of the communication link, a combined error value, which has been evaluated or determined from a plurality of individual error values. The individual error values each correspond to a respective one of the signal carriers.

The above summary is merely intended to give a brief overview of some features of some embodiments of the present invention, and other embodiments may comprise additional and/or different features than the ones mentioned above. In particular, this summary is not to be construed to be limiting the scope of the present application.

DETAILED DESCRIPTION

Figure 1:
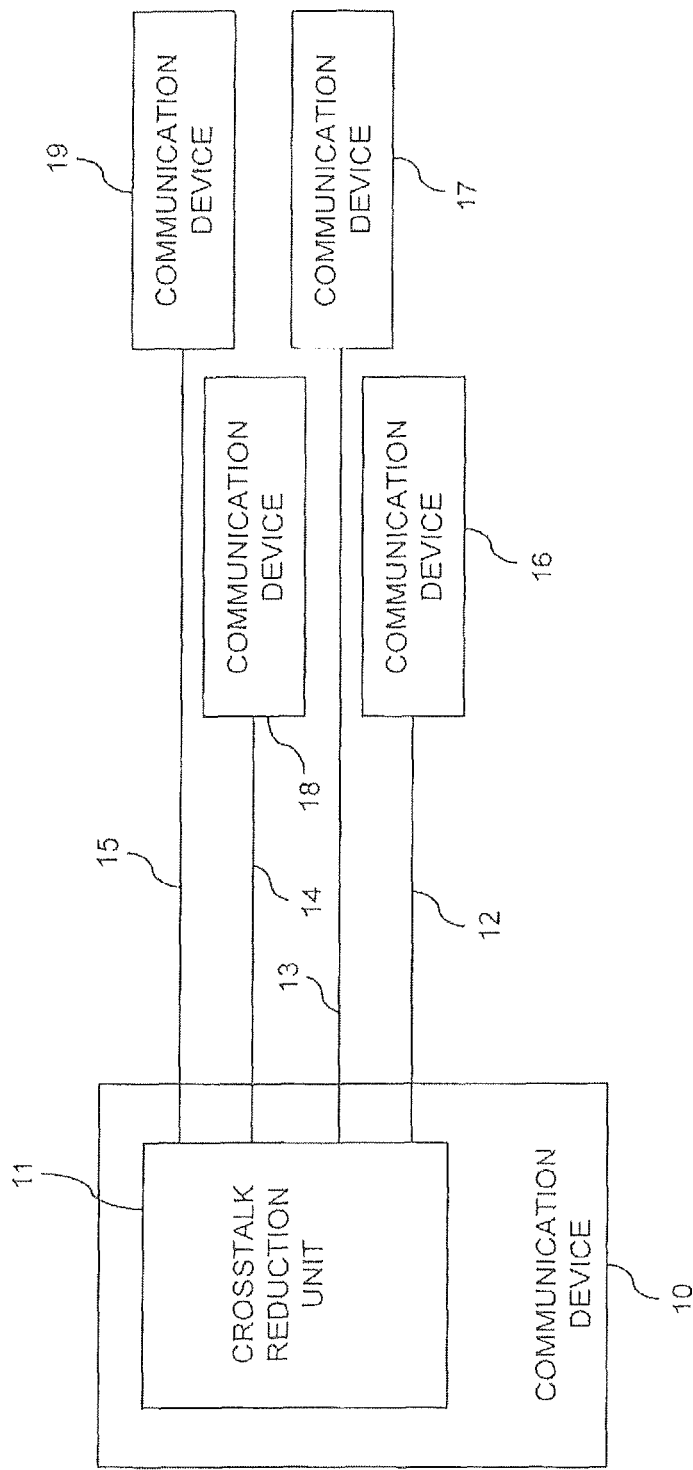
FIG. 1 schematically illustrates a communication system according to an embodiment of the present invention.

In the following, some embodiments of the present invention will be described in detail. The embodiments relate to devices, systems and methods for error reporting in multi-carrier signal communication. It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling. Furthermore, it should appreciated that functional blocks or units shown in the drawings may be implemented as separate circuits in embodiments, but may also be fully or partially implemented in a common circuit in other embodiments. For example, several functional blocks may be implemented as software running on a common processor like a signal processor. It is further to be understood that any connection which is described as being wire-based in the following specification may also be implemented as a wireless communication unless noted to the contrary.

It should be noted that the drawings are provided to give an illustration of some aspects of embodiments of the present invention and therefore are to be regarded as schematic only. In particular, the elements shown in the drawings are not necessarily to scale with each other, and the placement of various elements in the drawings is chosen to provide a clear understanding of the respective embodiment and is not to be construed as necessarily being a representation of the actual relative locations of the various components in implementations according to an embodiment of the invention.

The features of the various embodiments described herein may be combined with each other unless specifically noted otherwise.

The term "communication connection" as used herein is intended to refer to any kind of communication connection including wire-based communication connections and wireless communication connections.

In FIG. 1, a communication system according to an embodiment of the present invention is schematically shown.

In the communication system of FIG. 1, a communication device 10 communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located. In the following, the transmission direction from communication device 10 to communication devices 16, 17, 18 and 19 will be referred to as the downstream direction, and the opposite transmission direction from communication devices 16, 17, 18 and 19 to communication device 10 will be referred to as the upstream direction.

In the embodiments as illustrated herein, the communication system is configured to use multi-carrier communication signals. Examples of such multi-carrier signals are discrete multitone (DMT) signals as used in the DSL technology or orthogonal frequency division multiplexing (OFDM) signals as used in wireless mobile communication networks. That is to say, the signals transmitted and/or received by the communication devices 10, 16, 17, 18 and 19 comprise a plurality of signal carriers having different frequencies, sometimes also referred to as signal tones. According to an embodiment, the signal carriers may be grouped, e.g., into a number of bands. For example, one or more bands or groups of signal carriers may be provided for the downstream direction, and one or more bands or groups of signal carriers may be provided for the upstream direction.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication device 16, 17, 18 and 19 and through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the communication connections which are subjected to such a crosstalk reduction are also referred to as vectored group.

Reduction of crosstalk in the downstream direction is also referred to as crosstalk precompensation since the signals transmitted are modified before transmission, i.e., before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e., the vectoring, the crosstalk reduction unit 11 has to be "trained", i.e., the crosstalk reduction unit 11 needs information regarding the actual crosstalk occurring between the communication connections in the vectored group. This may for example be achieved by transmitting predetermined training signals, via the communication connections and analyzing the received signals to determine the crosstalk. In an embodiment, data transmission via the communication connections comprises the transmission of pilot symbols, e.g., in training signals, or in communication signals transmitted during normal operation. During normal operation, also referred to as "showtime" operation, payload data may be transmitted between the pilot symbols. In an embodiment, synchronization symbols may be used as the pilot symbols.

In an embodiment, the pilot symbols or modified pilot symbols are used for training the crosstalk reduction unit 11 and/or for monitoring signal transmission quality on the communication connections 12-15.

In a communication system like the one shown in FIG. 1, the situation may occur that a communication connection is to be added to the vectored group. For example, in the embodiment of FIG. 1 initially only communication connections 12, 13 and 14 may be included in the vectored group, while communication connection 15 may be inactive (for example communication device 19 may be switched off) and therefore not be added to the vectored group. When communication device 19 becomes active, in order to also reduce the crosstalk between communication connection 15 and communication connections 12-14 which already are incorporated in the vectored group, communication connection 15 is to be added to the vectored group. For such an additional communication connection to be added, crosstalk reduction unit 11 has to be trained and adapted accordingly.

In an embodiment, for adding an additional communication connection (like communication connection 15 in the above example) to a vectored group, a first vector training is performed to reduce or cancel the crosstalk resulting from the influence of the communication connection to be added, hereinafter also referred to as the joining connection, to the communication connections already in the vectored group. When this first vector training is completed, the influence of data transmitted over the joining connection on the data transmission of the connections already in the vectored group is minimized or at least reduced by an adaptation of the crosstalk reduction coefficients of the connections already in the vectored group in crosstalk reduction unit 11 of the embodiment of FIG. 1.

Some time, but not necessarily immediately after this first vector training, in the currently discussed embodiment a second vector training is performed to adapt the vectoring to reduce or cancel crosstalk resulting from the influence of the communication connections of the vectored group to the joining communication connection.

In one embodiment, which may be combined with the aforementioned embodiments, but also used separately, the vector training is generally performed using modified non-payload data carrying signals like pilot symbols or pilot signals as mentioned above. For example, synchronization symbols used in a standardized communication method like VDSL to synchronize super frames may be multiplied with sequences of +1 and −1, the sequences applied to the different communication connections 12-15 being chosen such that they are orthogonal to form pilot symbols. For example, Walsh-Hadamard sequences may be used as the modulation sequence.

As mentioned, for performing the above-mentioned training, training signals are sent via the communication connections, for example predefined sequences of signals. The training signals are multi-carrier signals. For training in the downstream direction, some or all of communication devices 16-19 compare received symbols, e.g., the above-mentioned pilot symbols, to expected symbols, e.g., to the (known) actually sent symbols. On the basis of the comparison, at least one individual error value is calculated or otherwise determined for each of the signal carriers. According to an embodiment, the multi-carrier signals comprise complex symbols. In one example, two individual error values may be evaluated or determined for each signal carrier, one corresponding to a real part error and the other corresponding to an imaginary part error. According to another example, two individual error values are evaluated or determined for each signal carrier, one corresponding to an in-phase error and the other corresponding to a quadrature error.

The individual error values measure a deviation of the received symbol from the expected symbol. The individual error values are then transmitted to communication device 10 on a backchannel of the respective communication connection. Crosstalk reduction unit 11 may then adapt the crosstalk reduction, i.e., the vectoring, based on the received error values. According to an embodiment, the individual error values are quantized before being transmitted. That is to say, the individual error values are converted to a suitable digital format for transmission. According to an embodiment, coarse quantization is used for the individual error values. For example, the quantized individual error values may have a bit number of two or less. According to an embodiment, only a single bit is used for quantizing the individual error values. The single bit may indicate the sign of the individual error value.

Using a coarse quantization for the individual error values according to one embodiment allows for saving bandwidth on the backchannel. However, for some purposes, it is advantageous to supplement the coarsely quantized individual error values by further error information. For example, during the above-mentioned vector training phases, it may be desirable to monitor a signal quality on the communication connection so as to determine whether the crosstalk compensation parameters are sufficiently adapted and the training phase can be terminated. In this respect, it is to be understood that terminating the training phase may involve terminating the adaption process, but may also involve continuing adaption, e.g., in a further training phase with different training parameters or training signals, or during showtime operation.

According to an embodiment, the communication devices 16-19 are configured to further process the individual error values before subjecting them to quantization. For this purpose, each of the communication devices 16-19 may be provided with an error processor (not illustrated in FIG. 1). The error processor may be implemented by software to be executed by a multi-purpose processor, e.g., a signal processor, or by dedicated hardware.

According to an embodiment, the individual error values are further processed to evaluate or determine at least one combined error value. According to one example, a single combined error value may be evaluated or determined for all signal carriers used in the multi-carrier signal. According to a further example, if there are multiple groups of signal carriers, a corresponding combined error value may be evaluated or determined for each group of signal carriers. That is to say, the combined error value is then evaluated or determined from the individual error values corresponding to the signal carriers of the group.

The at least one combined error value is then transmitted on the backchannel to the communication device 10. In this connection, the combined error value may be subjected to quantization before being transmitted, i.e., be transmitted as a quantized combined error value. However, it is to be understood that the combined error values may also be evaluated in a suitable format for transmission so that no further quantization is necessary. According to an embodiment, the combined error value is transmitted as a multibit value having a mantissa portion and an exponent portion. In this way, a high dynamic range can be covered by the combined error value. For example, the mantissa portion may have a bit number of eight or more, and exponent portion may have a bit number of four or more.

Different options may be used for evaluating the combined error value. According to one option, evaluating or generating the combined error value for a group of signal carriers comprises summing the absolute values of the individual error values corresponding to these signal carriers. Specifically, the combined error value may be the sum of the absolute values of the individual error values. In this case, the combined error value may be evaluated according to:

$$SA_k = \sum_i |\text{re}(E_i)| + |\text{im}(E_i)|, \quad (1)$$

where $SA_k$ denotes the combined error in the k-th group of signal carriers, $\text{re}(E_i)$ denotes the real part individual error for the i-th signal carrier of the group, and $\text{im}(E_i)$ denotes an imaginary part individual error for the i-th signal carrier of the group.

According to another option, evaluating the combined error value for a group of signal carriers may comprise squaring the individual error values corresponding to these signal carriers and summing the squared individual error values. Specifically, the combined error value may be the sum of the squared individual error values. In this case, the combined error value may be evaluated according to:

$$SS_k = \sum_i \text{re}(E_i)^2 + \text{im}(E_i)^2, \quad (2)$$

where $SS_k$ denotes the combined error in the k-th group of signal carriers, $\text{re}(E_i)$ denotes the real part individual error for the i-th signal carrier of the group, and $\text{im}(E_i)$ denotes the imaginary part individual error for the i-th signal carrier of the group.

According to a still further option, evaluating the combined error values for a group of signal carriers may comprise determining a maximum absolute value of the individual error values corresponding to these signal carriers. Specifically, the combined error value may be the maximum absolute value. In this case, the combined error value may be evaluated according to:

$$SM1_k = \max_i \{|\text{re}(E_i)|, |\text{im}(E_i)|\}, \quad (3)$$

where $SM1_k$ denotes the combined error in the k-th group of signal carriers, $\text{re}(E_i)$ denotes the real part individual error for the i-th signal carrier of the group, and $\text{im}(E_i)$ denotes the imaginary part individual error for the i-th signal carrier of the group.

According to a still further option, evaluating the combined error values for a group of signal carriers may comprise determining a maximum value of the respective sums of the absolute value of the real part individual error and the absolute value of the imaginary part individual error for each signal carrier. Specifically, the combined error value may be the maximum absolute value. In this case, the combined error value may be evaluated according to:

$$SM2_k = \max_i \{|\text{re}(E_i)| + |\text{im}(E_i)|\}, \quad (4)$$

where $SM2_k$ denotes the combined error in the k-th group of signal carriers, $\text{re}(E_i)$ denotes the real part individual error for the i-th signal carrier of the group, and $\text{im}(E_i)$ denotes the imaginary part individual error for the i-th signal carrier of the group.

The communication device 10 receives, from the back-channel, the individual error values and the combined error values as transmitted by the communication devices 16-19. That is to say, the communication device may receive at least one combined error value and a plurality of individual error values for each of the communication devices 16-19.

According to an embodiment, the individual error values are used as a basis for performing adaptation of crosstalk compensation parameters of the crosstalk reduction unit 11 in the communication device 10. The combined error value or values are in turn used for monitoring signal transmission quality on the respective communication connections 12-15. For example, monitoring the signal transmission quality may be used as a basis for initiating and/or terminating adaptation of the crosstalk compensation parameters. However, it is to be understood that monitoring the signal transmission quality may be useful for other purposes as well. Also, it is to be understood that according to some embodiments only the combined error value may be transmitted.

Figure 2:
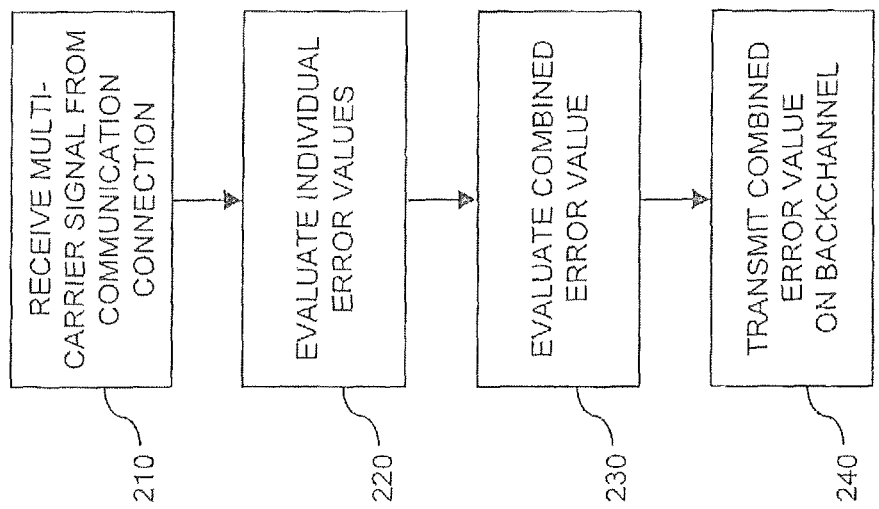
FIG. 2 shows a flowchart for illustrating a method according to an embodiment of the present invention.

In FIG. 2, a flow diagram of a method according to an embodiment is shown. The method of FIG. 2 may for example be implemented in a communication device at a downstream end of a communication connection, for example in one, some or all of communication devices 16-19. While the exemplary method is illustrated and described below as a series of acts or events, it will be appreciated that the present disclosure is not limited by the illustrated ordering of such acts or events. For example, some acts may occur in different orders and/or concurrently with other acts or events apart from those illustrated and/or described herein, in accordance with the disclosure. In addition, not all illustrated steps may be required to implement a methodology in accordance with the present disclosure.

At 210, a multi-carrier signal is received. The multi-carrier signal may be a training signal which is predefined and known by the receiver. The multi-carrier signal may also be a showtime communication signal comprising known symbols at predefined positions. For example, as explained above the multi-carrier signal may comprise synchronization symbols or pilot symbols modified according to a predefined sequence, for example a Walsh-Hadamard sequence, wherein for example sequences used for different communication connections are orthogonal to each other.

At 220, individual error values are evaluated or generated. In particular, at least one individual error value is evaluated or generated for each signal carrier of the multi-carrier signal. As mentioned above, the individual error values may be evaluated or generated from a deviation of a received symbol of the multi-carrier signal from an expected symbol, e.g., the above mentioned pilot symbols or synchronization symbols.

At 230, a combined error value is evaluated or generated from the individual error values. As mentioned above, one combined error may be evaluated or generated for all signal carriers, or multiple combined error values may be evaluated or generated, each pertaining to a group of signal carriers. Further, as mentioned above, the combined error value may be evaluated or generated by summing absolute values of the individual error values, by summing the squared individual error value, or by determining a maximum absolute value of the individual error values.

At 240, at least the combined error value is transmitted on a backchannel of the communication connection. As mentioned above, the individual error values may be quantized and then transmitted on the backchannel as well.

Figure 3:
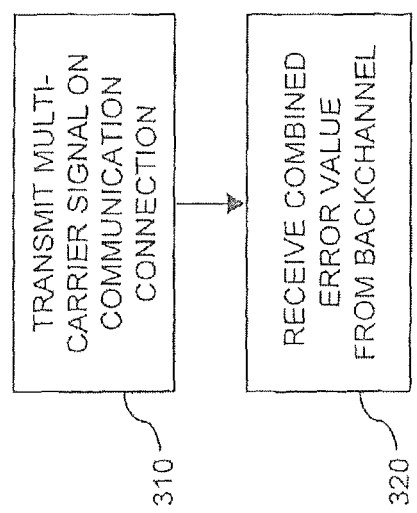
FIG. 3 shows a flowchart for illustrating a further method according to an embodiment of the present invention.

In FIG. 3 an embodiment of a method which may for example be implemented at an upstream side of a communication system, for example in communication device 10 of FIG. 1, is shown. The embodiment of FIG. 3 may be used in the same system as the embodiment of FIG. 2 and cooperate with the embodiment of FIG. 2. However, the embodiments of FIGS. 2 and 3 may also be used independently from each other.

At 310, a multi-carrier signal is transmitted on one or more communication connections. In one embodiment the multi-carrier signal may be of the same type as explained in connection with FIG. 2.

At 320, at least a combined error value, evaluated from a plurality of individual error values corresponding to different signal carriers of the multi-carrier signal, is received from a backchannel of the communication connection. If there are multiple communication connections, at least one combined error value may be received from a respective backchannel of each communication connection. It is to be understood, that the combined error value may also be received from a backchannel of only one of multiple communication connections. The combined error value may be used for monitoring signal transmission quality, e.g., with respect to crosstalk.

In some embodiments, when the crosstalk from a joining communication connection to communication connections already in the vectored group is to be monitored, combined error values may be received from communication devices coupled to communication connections of the vectored group. Conversely, if the crosstalk from the communication connections in the vectored group to the joining communication connection is to be monitored, the combined error value may be received from a communication device coupled to the joining communication connection.

In addition to the combined error value, also quantized individual error values may be received from the backchannel. As mentioned above, the quantized individual error values may be used as a basis for performing adaptation of crosstalk compensation parameters. The combined error value or values may then be used as a basis for initiating and/or terminating a training phase or may be used as a basis of the adaption process, e.g., for adjusting time constants. For example, the crosstalk compensation parameters may be adapted so as to minimize the received individual error signals received. For example, coefficients for calculating the above-mentioned linear combinations of signals may be adapted.

The embodiments of FIGS. 2 and 3 may generally be used in vectored communication systems where transmitters and/or receivers for a plurality of communication connections are co-located and signals are processed jointly as explained above. A particular example for a communication system where these methods may be implemented is a DSL communication system like a VDSL communication system. An example for such a system according to an embodiment of the present invention will now be discussed with reference to FIG. 4.

Figure 4:
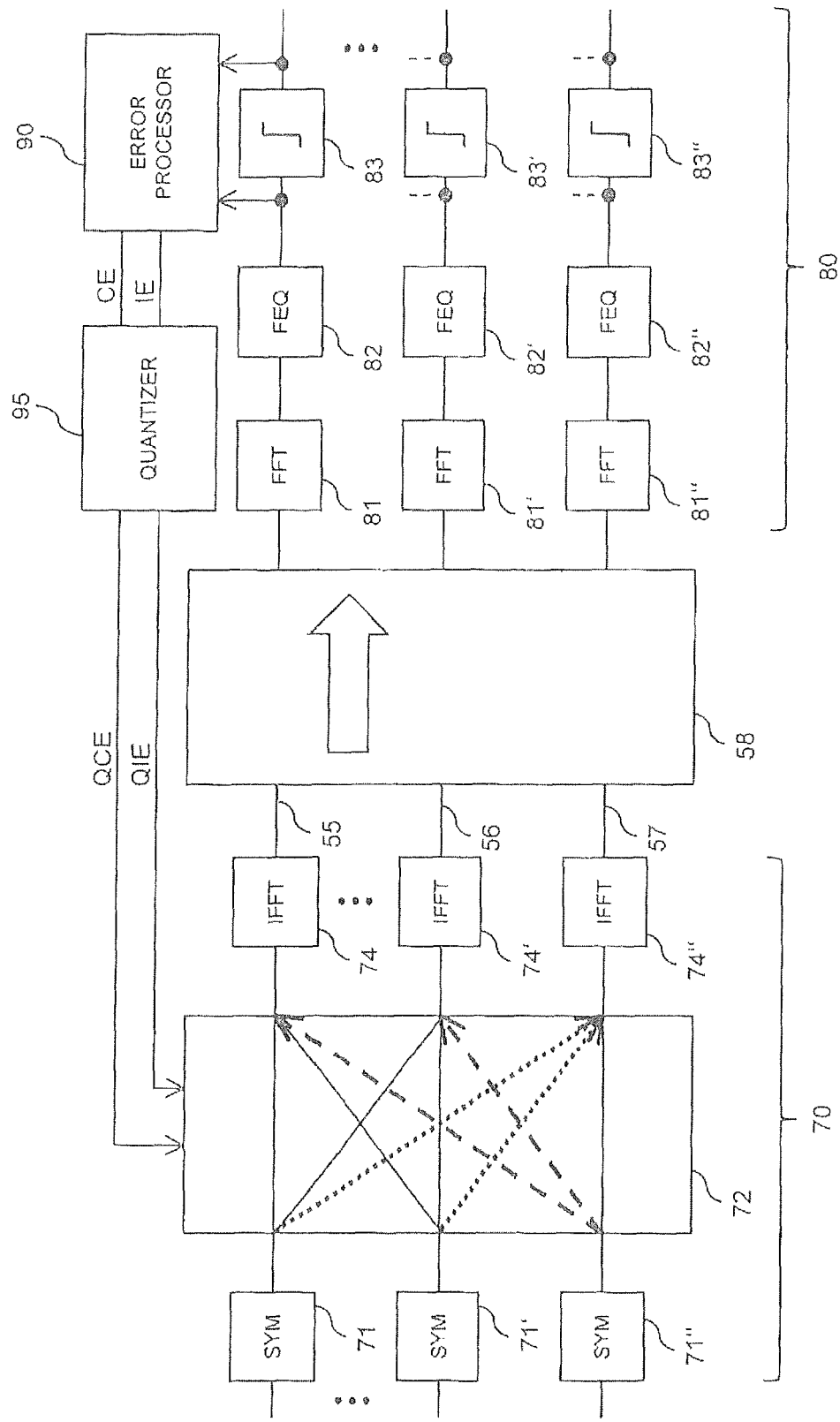
FIG. 4 schematically illustrates a block diagram of a communication system according to an embodiment of the present invention.

In the system shown in FIG. 4, data is transmitted from a central office 70 via a plurality of communication lines 55, 56, 57 to a plurality of receivers in customer premises generally labeled with 80. In the system of FIG. 4, the communication lines are joined in a so-called cable binder 58. Communication lines in a cable binder are usually located comparatively close to each other and are therefore prone to crosstalk. In the system shown in FIG. 4, communication lines 55 and 56 as well as further (not shown) communication lines indicated by vertical dotted lines are already incorporated in the vectored group. It should be noted that the number of communication lines in the vectored group is not limited to any particular number. Communication line 57 in the example shown may be a joining line, i.e., a communication line to be added to the vectored group.

In the system of FIG. 4, a symbol mapper denoted with reference numerals 71, 71' and 71" maps data, e.g., payload or training data, onto carrier constellations which are to be transmitted via communication lines 55, 56 and 57, respectively. A crosstalk precompensator 72 modifies these symbol mappings in order to precompensate crosstalk occurring during the transmission. The such modified carrier mappings are modulated onto a plurality of carriers for each communication line, said carriers having different frequencies, and are then transferred into signals in the time domain by inverse fast Fourier transformation (IFFT) blocks 74', 74' and 74", respectively. This type processing corresponds to the above-mentioned DMT modulation and is commonly used in DSL systems like VDSL systems or VDSL2 systems. The resulting modulated signals are then transmitted via the communication line to the customer premises. The received signals are then converted into the frequency domain by fast Fourier transformation (FFT) blocks 81, 81', and 81", respectively and equalized by frequency equalizers (FEQ) 82, 82', and 82", respectively before slicers 83, 83', and 83", respectively, output received constellations which, in case of an error-free transmission, correspond to input constellations as generated by the symbol mappers 71, 71', 71" and originally intended for transmission. It is to be understood that for clarity's sake only some elements of the communication devices involved are shown, and further devices like amplifiers, sampling units and the like may be present.

In an embodiment, during a first training phase, crosstalk from the joining line 57 to the lines already in the vectored group like lines 55 and 56 is to be reduced, the crosstalk being indicated in FIG. 4 by dashed arrows in crosstalk precompensator 72.

As already mentioned, for adapting the vectoring which is implemented in this case by crosstalk precompensator 72 to the joining line, synchronization symbols transmitted may be modified, e.g., by Walsh-Hadamard sequences to form orthogonal pilot sequences. The synchronization symbols on all the lines may be sent in a synchronized manner, i.e., at the same time.

In an embodiment, a specific sequence is reserved for joining lines. For example, using the Walsh-Hadamard sequences multiplying the synchronization symbols with sequences of +1 and −1 described above, a sequence consisting only of +1 values or of alternating +1 and −1 values may be reserved for joining lines.

On the joining line, during this training phase quiet symbols or carrier-pilot symbols which only relate to one or a few carriers are transmitted between the synchronization symbols. Therefore, the data transmission occurring in the vectored lines already in the vectored group between the synchronization symbols is not or is not significantly disturbed by crosstalk and can continue during this phase.

Via respective backchannels in the vectored lines, an error signal is transmitted back to crosstalk precompensator 72. Error signal for the synchronization symbols is indicative of a difference between the synchronization symbols sent (which are known to the receiver since fixed sequences are used) and the symbols actually received. Based on this error signal, the crosstalk precompensator 72 is adapted to reduce the error, i.e., the difference between symbols sent and symbols received, by reducing the effect of crosstalk from the joining line to the vectored line. In FIG. 4, feedback of the error signal is illustrated only for the line 55. However, it is to be understood, that for the lines 56 and 57 feedback of the error signal may be implemented in a similar manner. As illustrated, the error signal transmitted back to the crosstalk precompensator 72 comprises quantized individual error values QIE and one or more quantized combined error value QCE.

In the following, further details with respect to generating the error signal will be explained by referring to the line 55. Again, it is to be understood that these concepts may be applied in the same manner for the lines 56 and 57.

As illustrated, the CPE for the line 55 comprises an error processor 90 and a quantizer 95. The error processor is coupled to the line 55 at taps located upstream and downstream of the slicer 83. The error processor is configured to evaluate, for each signal carrier of a received multi-carrier signal, at least one individual error value IE representing the deviation of a received symbol of the multi-carrier signal from an expected symbol, e.g., a predefined or known symbol. The individual error values may be evaluated as normalized error values. As a first result, the error processor 90 therefore obtains a plurality of individual error values IE, each corresponding to a different signal carrier. From the individual error values, the error processor 90 then evaluates or generates at least one combined error value CE. As explained in connection with FIGS. 1 and 2, one combined error value CE may be evaluated or generated for all signal carriers, or multiple combined error values CE may be evaluated, each pertaining to a group of signal carriers. Further, the combined error value CE may be evaluated or generated by summing absolute values of the individual error values IE, by summing the squared individual error value, or by determining a maximum absolute value of the individual error values IE.

The individual error values IE and the combined error value CE are then supplied to the quantizer 95, which generates the quantized individual error values QIE and the quantized combined error value QCE. According to an embodiment, the quantizer 95 is configured to generate the quantized individual error values QIE with a coarse quantization resulting in quantized individual error values having a first bit number of two or less, whereas the quantized combined error value is generated with a fine quantization resulting in a quantized combined error value having a second bit number which is higher than the first bit number, e.g., twelve or more. According to an embodiment, the quantized combined error value is represented by a multibit value comprising a mantissa portion, e.g., of eight bits, and an exponent portion, e.g., of four bits.

It is to be understood that the CPE for the line 56 and the CPE for the line 57 comprise a respective error processor and quantizer as well, which have not been illustrated for the sake of clarity.

In the CO 70, the quantized individual error values QIE and the quantized combined error value QCE may be used as a basis for adapting crosstalk compensation parameters of the precompensator 72. In this respect, the quantized individual error values may be used for error feedback for coefficient adaptation, whereas the quantized combined error value QCE may be used as a basis for initiating and/or terminating the adaptation process.

It should be noted that while in FIG. 4 the scenario where crosstalk from the joining line to the lines in the vectored group is cancelled is shown, also for the training phase where crosstalk from the lines in the vectored group to the joining line is cancelled individual error values and a combined error value, generated at the CPE coupled to the joining line, may be used. In other embodiments, the vectoring may be adapted to precompensate the crosstalk between the joining lines and the lines in the vectored group in the downstream direction in a single training phase. Also, it is to be understood that the quantized combined error values as received from the CPE may be used in the CO for other purposes as well, e.g., transmission quality monitoring or the like.

Figure 5:
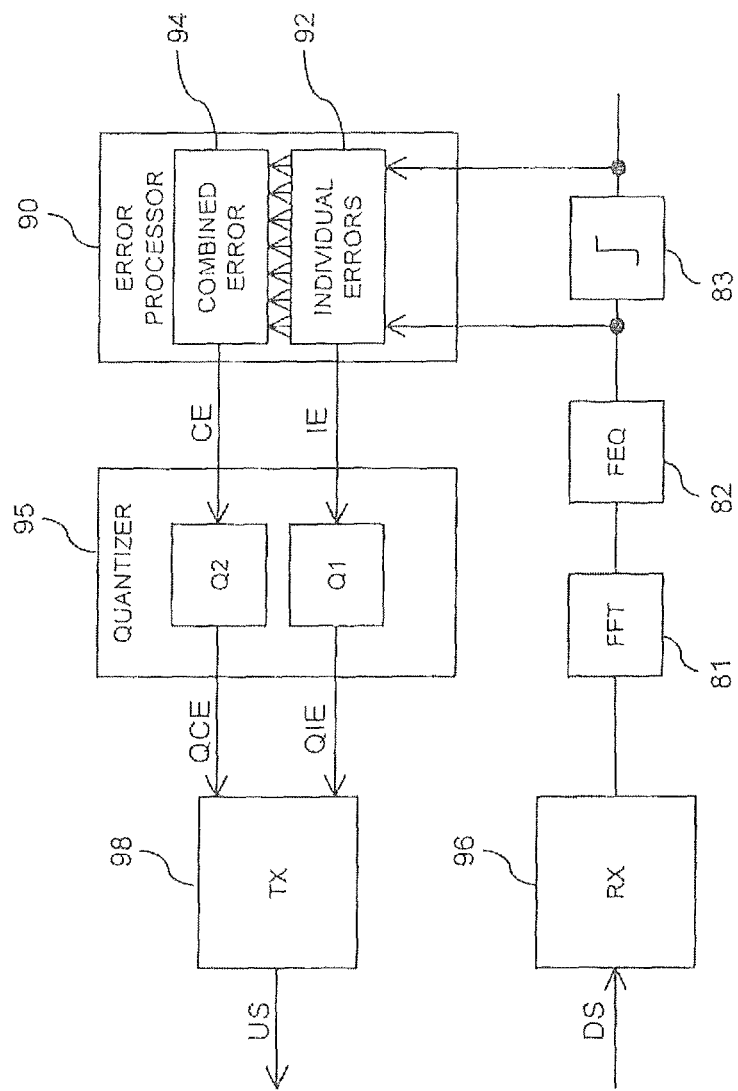
FIG. 5 schematically illustrates a communication device according to an embodiment of the present invention.

FIG. 5 schematically illustrates a customer premises communication device according to an embodiment of the invention, e.g., a communication device as used in the communication system of FIG. 4 for the line 55. In FIG. 5, elements which correspond to those of FIG. 4 have been designated with the same reference signs.

As illustrated, the communication device comprises a receiver (RX) 96 and a transmitter (TX) 98, which are coupled to the line (not illustrated). The receiver 96 receives a downstream signal DS, and the transmitter transmits an upstream signal US. The receiver 96 and the transmitter 98 may also be integrally formed in a single transceiver device. Moreover, the customer premises communication device comprises the FFT block 81, the frequency equalizer 82, the slicer 83, the error processor 90, and the quantizer 95.

As illustrated, in one embodiment the quantizer 90 comprises an individual error evaluation or determination block 92, which accomplishes evaluation or determination of the individual error values IE, and a combined error evaluation or determination block, which accomplishes evaluation or determination of the at least one combined error value CE. The quantizer 95 comprises a first quantization block Q1 which accomplishes quantization of the individual error values IE to generate the quantized individual error values QIE, and a second quantization block Q2 which accomplishes quantization of the at least one combined error value CE to generate the quantized combined error value or values QCE. The transmitter 98 is configured to transmit the quantized individual error values QIE and the quantized combined error value or values QCE on the backchannel, which is implemented in the upstream signal US. This may be accomplished using DMT modulation as well and it is to be understood that the customer premises communication device will then also be equipped with components needed to implement DMT modulation of the upstream signal, e.g., a symbol mapper or an IFFT block.

Figure 6:
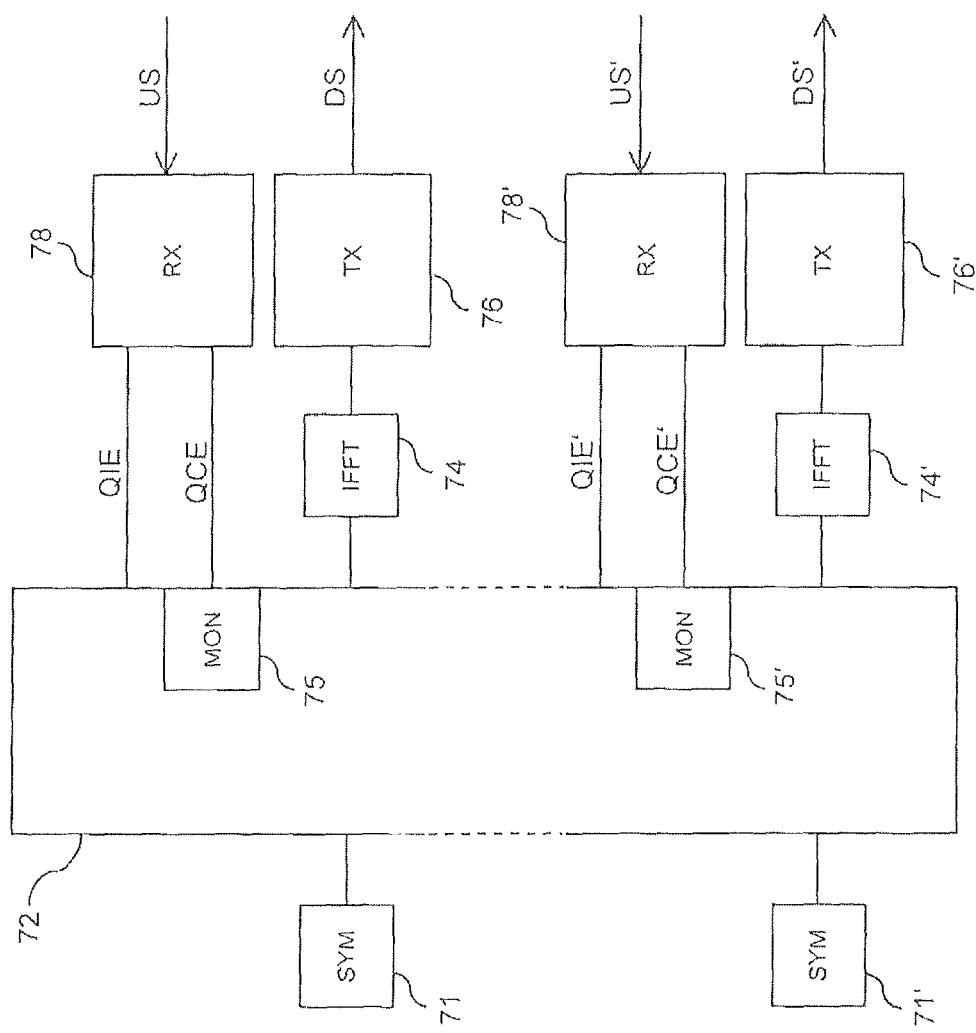
FIG. 6 schematically illustrates a communication device according to an embodiment of the invention.

FIG. 6 schematically illustrates a CO communication device according to an embodiment of the invention, e.g., a CO communication device as used in the communication system of FIG. 4. In FIG. 6, elements which correspond to those of FIG. 4 have been designated with the same reference signs.

As illustrated, the CO communication device comprises a transmitter (TX) 76, 76' for each line and a receiver 78, 78' for each line. The transmitters 76, 76' transmit respective downstream signals DS, DS' and the receivers 78, 78' receive respective upstream signals US, US'. Each pair of transmitter 76, 76' and receiver 78, 78' may also be integrally formed in a single transceiver device. In addition, the CO communication device comprises a monitoring device 75, 75' for each line. Moreover, the CO communication device comprises the precompensator 72 and, for each line, the symbol mapper 71, 71' and the IFFT block 74, 74'.

As further illustrated, the receivers 78, 78' receive the quantized individual error values QIE, QIE' from the respective the upstream signal US, US' and supply the received quantized individual error values QIE to the precompensator 72, where they may be used as a basis for adaptation of crosstalk compensation parameters. In addition, the receivers 78, 78' receive the quantized combined error values QCE, QCE' from the respective upstream signal US, US' and supply the received quantized combined error values QCE, QCE' to the respective monitoring device 75, 75'.

On the basis of the received quantized combined error value or values, the monitoring device 75, 75' monitors the transmission quality on the respective line. Specifically, the transmission quality may be monitored with respect to effects of crosstalk. The monitored transmission quality may be used as a basis for initiating and/or terminating a training phase for adaptation of crosstalk compensation parameters. For example, if the combined error value increases above a given threshold during showtime operation, which indicates a reduced transmission quality, the training phase of crosstalk compensation parameters may be initiated. On the other hand, if during adaptation in a training phase, the combined error value falls below a given threshold, the training phase may be terminated. This may also involve terminating the adaption process, or continuing the adaption process, e.g., in another training phase with different training parameters or different training signals, or during showtime operation.

In FIG. 6, for a better overview only components of the CO communication equipment for two lines have been illustrated, but it is to be understood that the CO communication device may actually be equipped with an arbitrary number of these components, depending on the number of lines to be coupled to the CO communication device. Also, rather than using a separate monitoring device for each line, it is also possible to use a single monitoring device having multiple inputs to receive the combined error value or values of the different lines.

Figure 7:
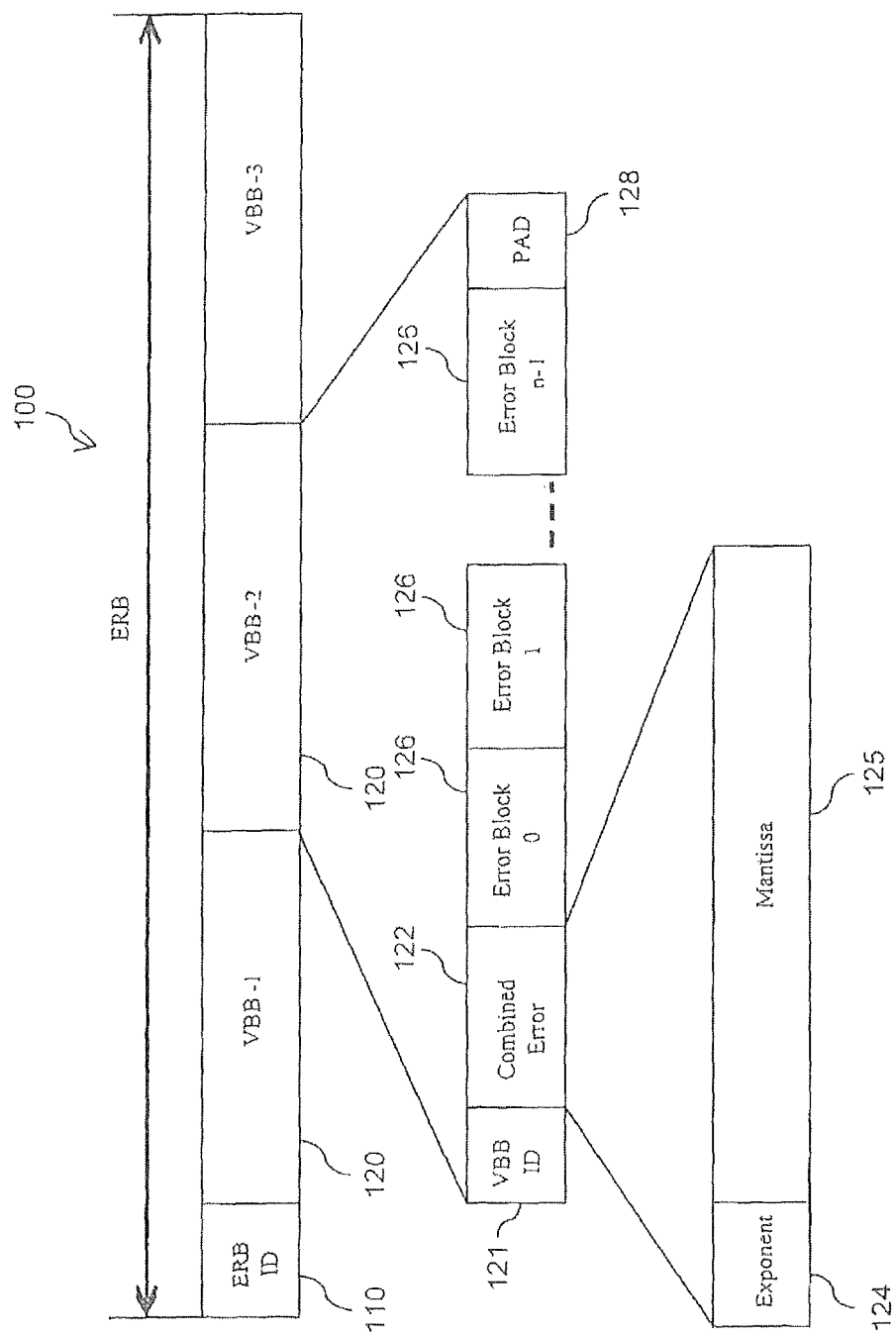
FIG. 7 schematically illustrates the structure of an error reporting block as used in an embodiment of the invention.

FIG. 7 schematically illustrates the structure of an error reporting block (ERB) 100 which may be used in the above embodiments for reporting both the combined error value and the individual error values. The error reporting block 100 is transmitted as data on the backchannel from the customer premises communication device, e.g., the customer premises communication device as illustrated in FIG. 5, to the CO communication device, e.g., the CO communication device as illustrated in FIG. 6.

As illustrated, the error reporting block 100 comprises an error block identifier field (ERB ID) 110, and a number of band error block sections (VBB-1, VBB-2, VBB-3) 120. The error reporting block identifier field 110 comprises identification information of the error reporting block 100. The band error block sections 120 comprise error information with respect to a specific band, i.e., a group of signal carriers, used on the communication connection. Such bands may be for example the three different downstream bands as used in VDSL, which range from 0.28 to 3.75 MHz, from 5.2 to 8.5 MHz and from 12.0 to 17.6 MHz.

The substructure of the band error block sections 120 comprises a band error block identifier field (VBB ID) 121, a combined error field 122, and a sequence of individual error fields 126, also referred to as error blocks. At least one individual error field 126 is provided for each of the signal carriers in the band. The sequence of individual error fields 126 is terminated by a termination field (PAD) 128.

The band error block identifier field 110 comprises identification information of the band error section 120, e.g., for distinguishing band error sections 120 from each other. The band error block identifier field may have a length of four bit.

The combined error field 122 comprises the (quantized) combined error value for this band of signal carriers. According to the illustrated embodiment, the combined error field comprises an exponent portion 124, and a mantissa portion 125. The exponent portion may have a length of four bits, and the mantissa portion may have a length of eight bits, resulting in an overall length of twelve bits in one example.

The individual error fields 126 may have lengths of two bits or less, which corresponds to a coarse quantization of the individual error values. According to an embodiment, the individual error fields 126 may have lengths of only one bit, which is used to encode the sign of the individual error.

It is to be understood that the illustrated structure of the error reporting block is merely exemplary and may be modified as appropriate, e.g., by rearranging fields or adding further fields.

FIGS. 8-12 show simulation results for an exemplary VDSL2 system using an AWG 24 cable. A background noise of −135 dBm/Hz was assumed.

Figure 8:
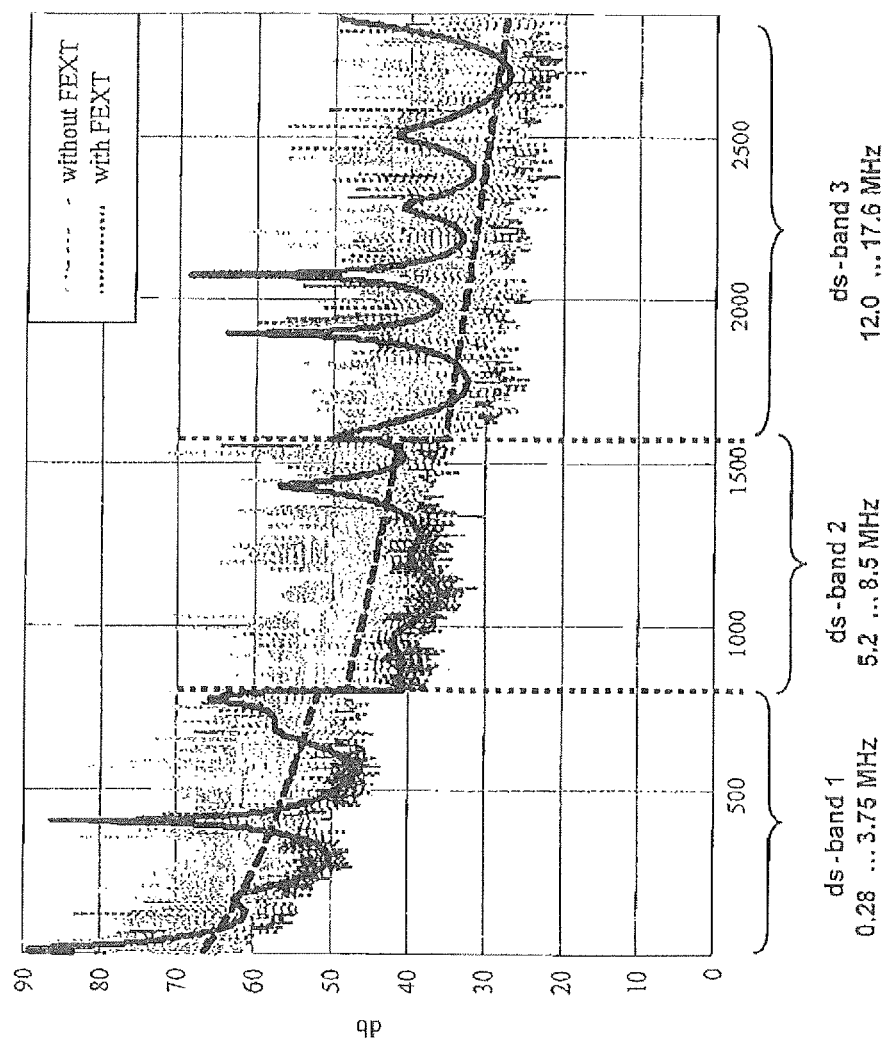
FIG. 8 is a diagram showing simulated signal-to-noise ratios in a communication system according to an embodiment of the invention.

The diagram of FIG. 8 shows signal-to-noise (SNR) values on a vectored line. The SNR is plotted for different signal carriers in the three downstream bands (ds1: 0.28 to 3.75 MHz, ds2: 5.2 to 8.5 MHz, ds3: 12.0 to 17.6 MHz) of VDSL2. Light shaded lines show the SNR without FEXT or with all FEXT cancelled. The dark shaded lines show the SNR with a single FEXT disturber in the form of a joining line transmitting a training signal. Further, the solid line shows the analytical course of the assumed FEXT disturbance, whereas the dashed line shows the analytical course of the assumed background noise. As can be seen, the influence of the FEXT is to reduce the SNR. This in turn will cause an increase of the individual error values evaluated at the CPE.

Figure 9A:
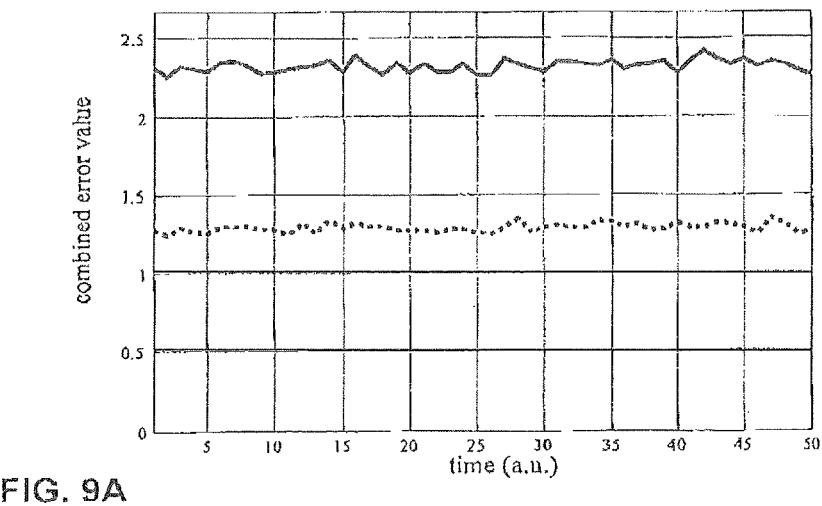
FIGS. 9A, 9B, and 9C are diagrams respectively showing simulated combined error values in a scenario corresponding to FIG. 8.
Figure 9B:
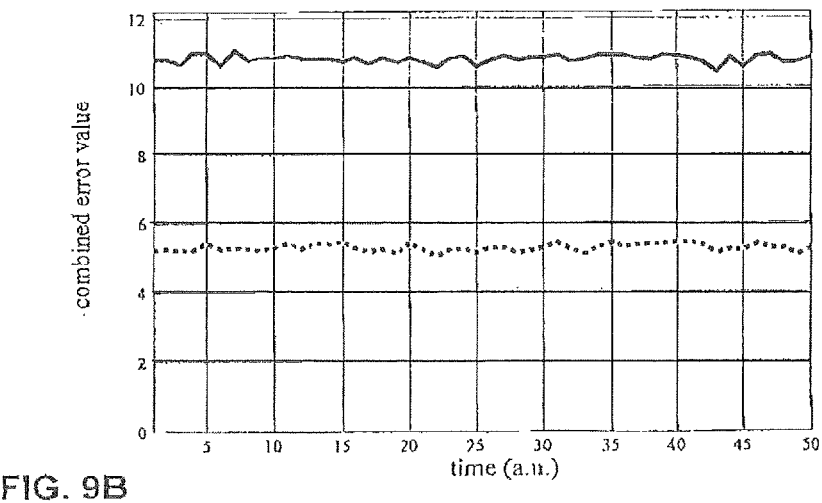
Figure 9C:
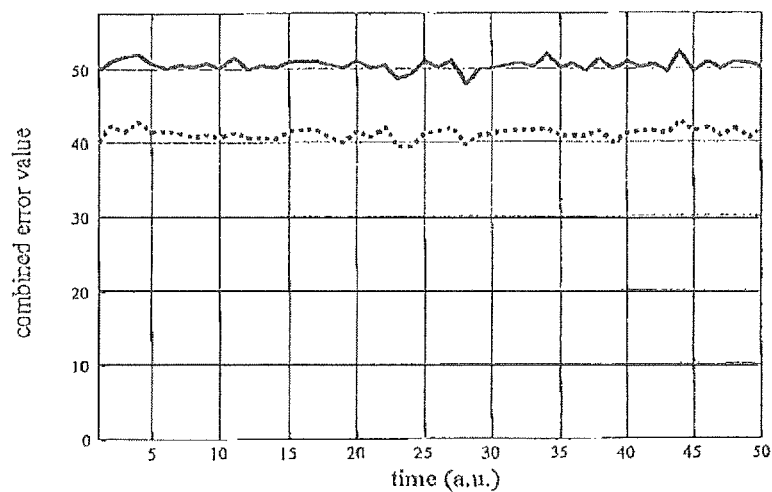

FIGS. 9A, 9B, and 9C show the combined error values as repeatedly evaluated using Equation (1) and assuming the scenario of FIG. 8. FIG. 9A relates to the ds1 band, FIG. 9B relates to the ds2 band, and FIG. 9C relates to the ds3 band. The solid line shows the situation without FEXT, whereas the dotted line shows the situation with the additional FEXT disturbance. As can be seen, the additional FEXT disturbance causes a significant increase in the combined error value. Statistical variations if the combined error value are small as compared to this increase.

Figure 10:
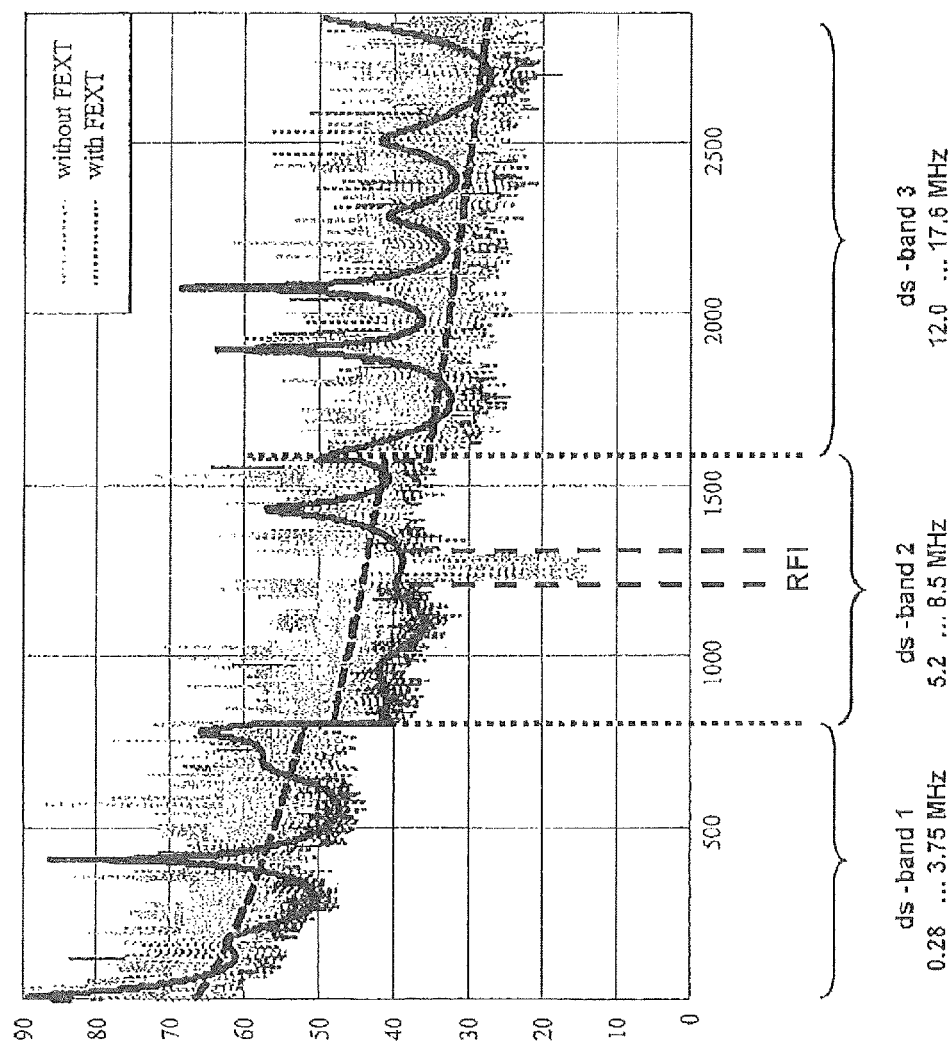
FIG. 10 is a diagram showing simulated signal-to-noise ratios in a communication system according to an embodiment of the invention in a scenario with a narrow-band radio frequency interferer being present.

FIG. 10 is a diagram similar to FIG. 8 and shows simulated SNR values in a scenario in which there is an additional strong narrow-band disturbance or RFI (radio frequency interference) between 7 MHz and 7.3 MHz, i.e., in the ds2 band, which is modeled as 25 dB increase of the background noise in this frequency region. This model also reflects the expected behavior in the presence of a bridged tap. As can be seen, the SNR values without and with FEXT are significantly reduced in the region of the narrow-band disturbance. Otherwise, the SNR values are similar as in the scenario of FIG. 8.

Figure 11A:
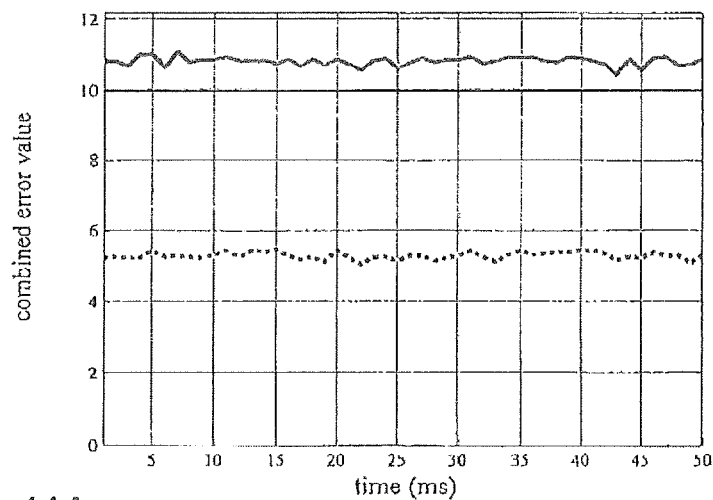
FIGS. 11A and 11B are diagrams respectively showing simulated combined error values in a scenario corresponding to FIG. 10.
Figure 11B:
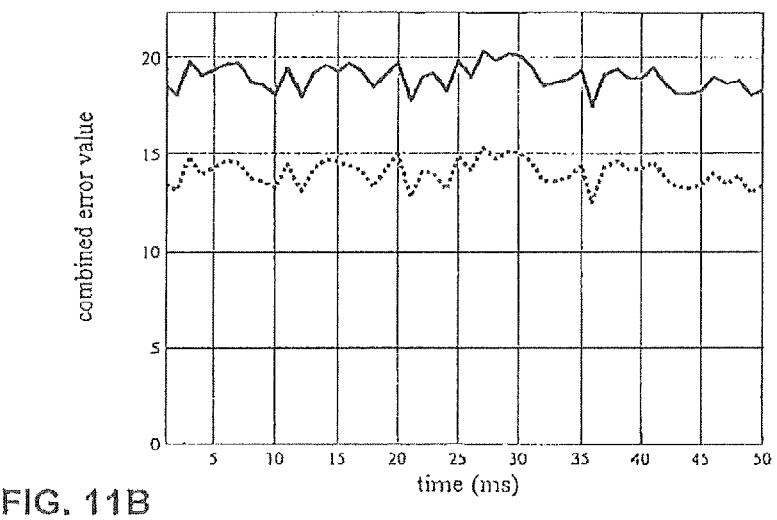

FIGS. 11A and 11B show the combined error values for the ds2 band as repeatedly evaluated using Equation (1) and assuming the scenario of FIG. 10. FIG. 11A relates to the scenario without RFI and FIG. 11B relates to the scenario with RFI. The solid line shows the situation without FEXT, whereas the dotted line shows the situation with the additional FEXT disturbance. As can be seen, the additional FEXT disturbance causes a significant increase in the combined error value. Statistical variations if the combined error value are small as compared to this increase. Even in the presence of the RFI the combined error values evaluated with FEXT are still significantly larger than the combined error values evaluated without FEXT.

Figure 12A:
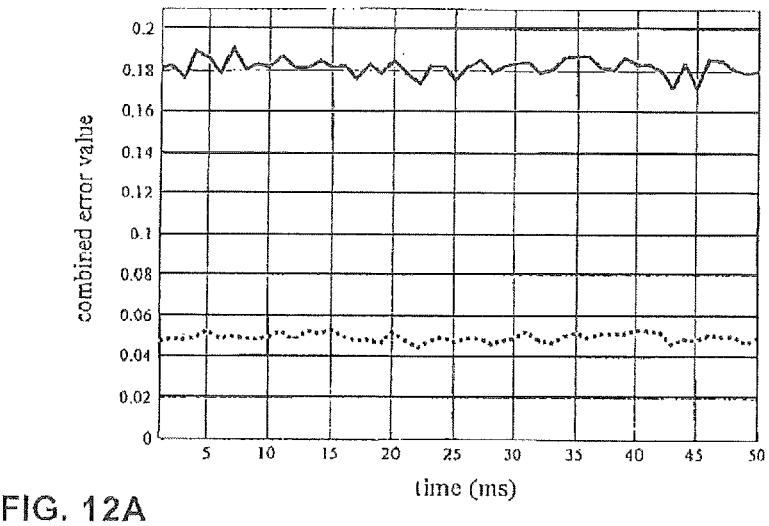
FIGS. 12A and 12B are diagrams respectively showing further simulated combined error values in a scenario corresponding to FIG. 10.
Figure 12B:
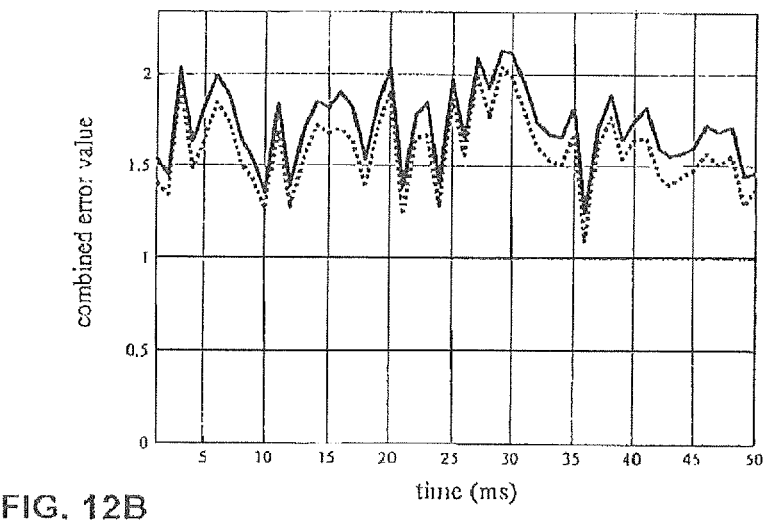

FIGS. 12A and 12B are diagrams similar to FIGS. 11A and 11B, but show combined error values evaluated according to Equation (2). FIG. 12A relates to the scenario without RFI and FIG. 11B relates to the scenario with RFI. The solid line shows the situation without FEXT, whereas the dotted line shows the situation with the additional FEXT disturbance. As can be seen, the additional FEXT disturbance causes an increase in the combined error value. Statistical variations if the combined error value are small as compared to this increase. Even in the presence of the RFI, the combined error values evaluated with FEXT are consistently larger than the combined error values evaluated without FEXT. However, in the presence of the RFI, the increase of the combined error value due to the additional FEXT is less significant than in FIG. 11B.

Accordingly, the simulation results show that the combined error values as evaluated using Equation (1) or (2) are good probes for detecting or monitoring signal transmission degradations due to FEXT. At the same time, since it allows for simultaneous reporting for a plurality of signal carriers, capacity of the backchannel is used in an efficient manner.

It should be noted that the above-described embodiments serve only as examples for implementations of some embodiments of the present invention, and the application of the present invention is not restricted to these embodiments. For example, while specific systems using a DSL standard like VDSL have been explained in detail, the concepts of reporting combined error values may also be applied in other systems including wireless systems. Also, it is to be understood that the concepts of error reporting as described above may be applied in different types of training processes or for other purposes than training processes. Therefore, the present invention is not to be limited to the above-described embodiments, but is intended to be limited only by the appended claims and equivalents thereof.

What is claimed is:

1. An apparatus, comprising:
   a receiver at a receipt location configured to receive, from a vectored very high bit rate digital subscriber line, VDSL, communication connection, a multi-carrier signal comprising a group of signal carriers;
   an error calculator configured to determine, for each of the signal carriers of the group, at least one individual deviation of a symbol of the received multi-carrier signal from an expected symbol, and to determine a combined deviation from the individual deviations;
   a quantizer configured to generate quantized deviations from the individual deviations and the combined deviation, the quantized individual deviations having a first bit number and the quantized combined deviation having a second bit number which is higher than the first bit number; and
   a transmitter at the receipt location configured to transmit the quantized individual deviations and the quantized combined deviation on a backchannel of the vectored VDSL communication connection.

2. The apparatus according to claim 1, wherein the first bit number is two or less.

3. The apparatus according to claim 1, wherein the quantized combined deviation is a multibit value comprising an exponent portion and a mantissa portion.

4. The apparatus according to claim 1, wherein the error calculator, in determining the combined deviation is further configured to sum the absolute values of the individual deviations.

5. The apparatus according to claim 1, wherein the error calculator, in determining the combined deviation is further configured to square the individual deviations and sum the squared individual deviations.

6. The apparatus according to claim 1, wherein the error calculator, in determining the combined deviation is further configured to determine a maximum absolute value of the individual deviations.

7. The apparatus according to claim 1, wherein the multi-carrier signal is a vectoring training signal.

8. The apparatus according to claim 1,
   wherein the multi-carrier signal comprises a plurality of groups of signal carriers,
   wherein the error calculator is configured to evaluate, for each of the signal carriers of the plurality of groups at least one individual deviation of a symbol of the received multi-carrier signal from an expected symbol and to evaluate, for each of the groups, a combined deviation from the individual deviations corresponding to the signal carriers of the group, and
   wherein the transmitter is configured to transmit on the backchannel the combined deviations of each group.

9. An apparatus, comprising:
   a transmitter at a transmission location configured to transmit on a vectored VDSL communication connection a multi-carrier signal comprising a group of signal carriers; and
   a receiver at the transmission location configured to receive a plurality of quantized individual deviations of a symbol of the multi-carrier signal from an expected symbol and a quantized combined deviation from a backchannel of the vectored VDSL communication connection, the combined deviation being generated from a plurality of individual deviations each corresponding to a respective one of the signal carriers of the group and the quantized individual deviations being generated from the individual deviations, the quantized individual deviations having a first bit number and the quantized combined deviation having a second bit number which is higher than the first bit number.

10. The apparatus according to claim 9, further comprising:
    a vectoring device configured to reduce the influence of crosstalk between the vectored VDSL communication connection and at least one further vectored VDSL communication connection by vectoring,
    wherein the vectoring device is configured to perform, during a training phase, adaptation of crosstalk compensation parameters on the basis of the received quantized individual deviations; and to initiate and/or terminate the training phase based on the received quantized combined deviation.

11. The apparatus according to claim 9, further comprising:
   a monitoring device configured to monitor, based on the received quantized combined deviation, signal transmission quality on the vectored VDSL communication connection.

12. The apparatus according to claim 9, wherein the quantized combined deviation is a multibit value comprising an exponent portion and a mantissa portion.

13. The apparatus according to claim 9, wherein the multi-carrier signal is a vectoring training signal.

14. The apparatus according to claim 10, wherein the vectoring device is further configured to terminate the training phase if the received quantized combined deviation is below a given threshold.

15. A method, comprising:
   receiving at a receipt location a multi-carrier signal comprising a group of signal carriers on a vectored VDSL communication connection;
   determining, for each of the signal carriers, an individual deviation of a symbol of the multi-carrier signal from an expected symbol;
   generating a combined deviation from the individual error values;
   quantizing the individual deviations and the combined deviation, the quantized individual deviations having a first bit number and the quantized combined deviation having a second bit number which is higher than the first bit number; and
   transmitting from the receipt location the quantized individual deviations and the quantized combined deviation on a backchannel of the vectored VDSL communication connection.

16. The method according to claim 15, wherein the first bit number is two or less.

17. The method according to claim 15, wherein the quantized combined deviation is a multibit value comprising an exponent portion and a mantissa portion.

18. The method according to claim 15, wherein the combined deviation is the sum of the absolute values of the individual error values.

19. The method according to claim 15, further comprising:
   monitoring signal transmission quality based on the quantized combined deviation.

20. The method according to claim 16, further comprising:
   receiving at a transmission location the quantized individual error values and the quantized combined deviation;
   adapting, during a training phase, crosstalk compensation parameters based on the received quantized individual deviations;
   reducing at the transmission location the influence of crosstalk between the vectored VDSL communication connection and at least one further vectored VDSL communication connection based on the crosstalk compensation parameters; and
   initiating and/or terminating the training phase based on the quantized combined deviation.

21. The method according to claim 17, wherein the exponent portion has a bit number of at least four and the mantissa portion has a bit number of at least eight.

* * * * *